United States Patent

[11] 3,619,574

| [72] | Inventor | Daniel J. Mindheim<br>San Jose, Calif. |
|---|---|---|
| [21] | Appl. No. | 767,311 |
| [22] | Filed | Oct. 14, 1968 |
| [45] | Patented | Nov. 9, 1971 |
| [73] | Assignee | Time Systems Corporation<br>Mountain View, Calif.<br>Continuation-in-part of application Ser. No.<br>719,438, Apr. 8, 1968, now abandoned. |

[54] DIGITAL METER WITH AUXILIARY VISUAL ANALOG DISPLAY
10 Claims, 3 Drawing Figs.

[52] U.S. Cl. ...................................... 235/92 EA,
235/92 R, 324/99, 340/326
[51] Int. Cl. ...................................... G06m 3/06,
H03k 21/18
[50] Field of Search.......................... 235/92; -
340/378–379, 139, 326, 371; 315/84.5, 84.6;
324/99

[56] References Cited
UNITED STATES PATENTS

| 2,828,468 | 3/1958 | Ball et al. | 235/92 |
|---|---|---|---|
| 3,062,441 | 11/1962 | Martin | 235/92 |
| 3,161,867 | 12/1964 | Isborn | 235/92 |
| 2,827,626 | 3/1958 | DeMotte | 235/92 (65) |
| 3,134,015 | 5/1964 | Harrison | 235/92 |

*Primary Examiner*—Maynard R. Wilbur
*Assistant Examiner*—Joseph M. Thesz, Jr.
*Attorney*—Flehr, Hohbach, Test, Albritton & Herbert ABSTRACT: Digital meter having at least one decimal counting unit, digital display means giving a multidigit digital display of the count registered by the decimal counting unit, and analog display means giving an auxiliary display of the registered count. In the preferred embodiment, the auxiliary display is provided by the illumination of a light in a position corresponding to the value of the count displayed by the digital display means.

INVENTOR.
Daniel J. Mindheim

DIGITAL METER WITH AUXILIARY VISUAL ANALOG DISPLAY

CROSS REFERENCES TO RELATED APPLICATIONS

This application is a continuation-in-part of Application Ser. No. 719,438, filed Apr. 8, 1968, now abandoned.

BACKGROUND OF THE INVENTION

Heretofore digital meters have been provided in which a numerical read-out has been provided by the use of a Nixie tube and other types of display elements. It has been found that with such digital meters it is necessary for the person reading the meter to mentally conceive of the numbers being registered by the meter and then to determine the meaning of the numbers with respect to the range of the meter. With rapidly changing numbers it is difficult to mentally conceive of the range which is being covered by the meter. In addition, when it is necessary to view a plurality of the meters, it is laborious and time consuming to ascertain what range is being indicated by each of the meters. There is, therefore, a need for a new and improved digital meter in which auxiliary visual display means is provided which indicates by a physical position the location of the reading of the meter with respect to the range of the meter.

SUMMARY OF THE INVENTION AND OBJECTS

The digital meter with auxiliary visual analog display includes at least one decimal counting unit. Digital visual display means is connected to the decimal counting unit to give a visual display of the count registered by the digital counting unit. An additional visual display means is also connected to the same digital counting unit and gives an auxiliary visual display. The auxiliary visual display is of the analog type which indicates by physical location the location of the reading with respect to the range of the meter. This can take the form of an array of indicator elements so that each succeeding indicator element in the array indicates a reading of increased value.

In general, it is an object of the present invention to provide a digital meter which has auxiliary visual display means which indicates by a physical position the location of the reading of the meter with respect to the range of the meter.

Another object of the invention is to provide a digital meter of the above character which is relatively simple and economical to construct.

Another object of the invention is to provide a digital meter of the above character in which the additional visual display means requires very little additional space.

Additional objects and features of the invention will appear from the following description in which the preferred embodiments are set forth in detail in conjunction with the accompanying drawing.

DESCRIPTION OF THE PREFERRED EMBODIMENTS

Figure 1:
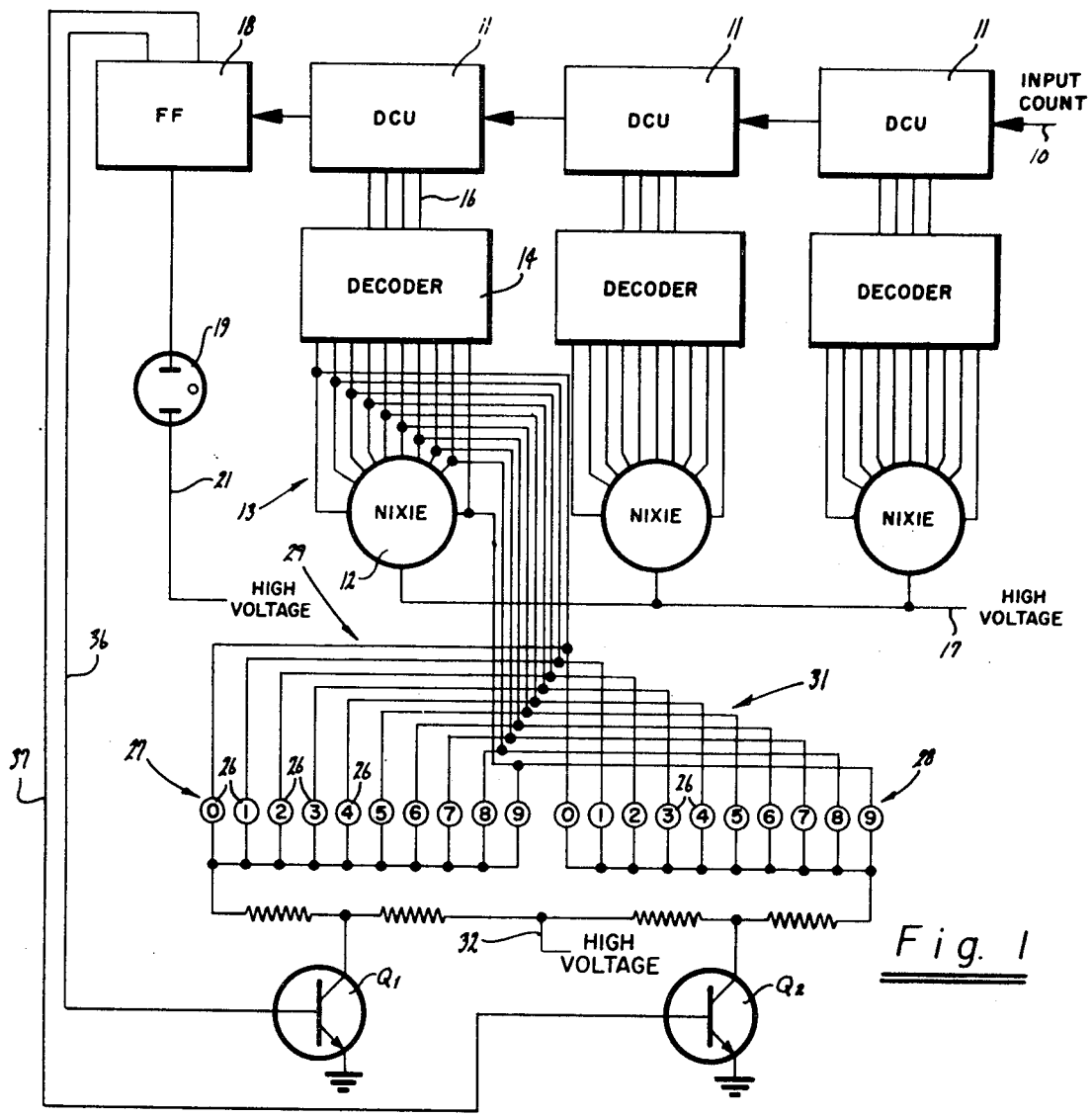
FIG. 1 is a circuit diagram partially in block form showing a digital meter with auxiliary visual display incorporating the present invention.

A circuit diagram showing the digital meter with auxiliary analog display is shown in FIG. 1 and consists of a plurality of decimal counting units 11 which are serially connected as shown so that the overflow from the preceding decimal counting unit. As indicated in FIG. 1, the events to be counted are supplied to an input terminal 10 connected to the first decimal counting unit in the series. Although a plurality of decimal counting units has been shown, it should be appreciated that it is only necessary to provide a single decimal counting unit to incorporate the present invention. The decimal counting units 11 can be of any conventional type which count input events from zero to 9 and then recycle.

Digital visual display means is provided for each of the decimal counting units to give a visual display of the count registered by the decimal counting unit. This visual display means can consist of any of the conventional visual display indicators which are presently available on the market. For example, the visual display means can take the form of Nixie tubes 12 supplied by Burroughs Corporation. As is well known to those skilled in the art, such Nixie tubes are provided with numerals from zero to nine which are illuminated to give the visual display. Means is provided for connecting these Nixies 12 to the decimal counting units 11 so that the Nixies 12 will give a visual display of the count registered by the associated decimal counting unit. Thus, there are provided ten conductors 13 which connect the Nixie tube 12 to decoder 14. The decoder 14 is connected by conductors 16 to the decimal counting unit 11. The decoders 14 are a conventional type and are utilized for translating information from the decimal counting units into a form that is usable by the Nixie tubes 12 so that the Nixie tube will give the display the proper numeral for the reading in the associated decimal counting unit. The Nixie tubes are connected to a suitable source of high voltage through a conductor 17 as indicated.

If desired and as shown in FIG. 1, an over-range indication can be provided in the digital meter. Typically, this can take the form of a flip-flop 18 which is capable of assuming set and reset states and which receives as its input a signal from the last decimal counting unit 11 in the series of decimal counting units. When the flip-flop 18 is in one of its states, it causes an indicator, such as a neon tube 19, to be lit by grounding one terminal of the the neon tube which is connected to a source of high voltage by conductor 21. Thus, when the flip-flop 18 is in one state, the neon tube is lit and when it is in the other state, it is not on. Typically, when the neon tube is not on, it indicates that the meter is not in an over-range position and when it is on, it indicates a one which does indicate an over-range condition.

Figure 2:
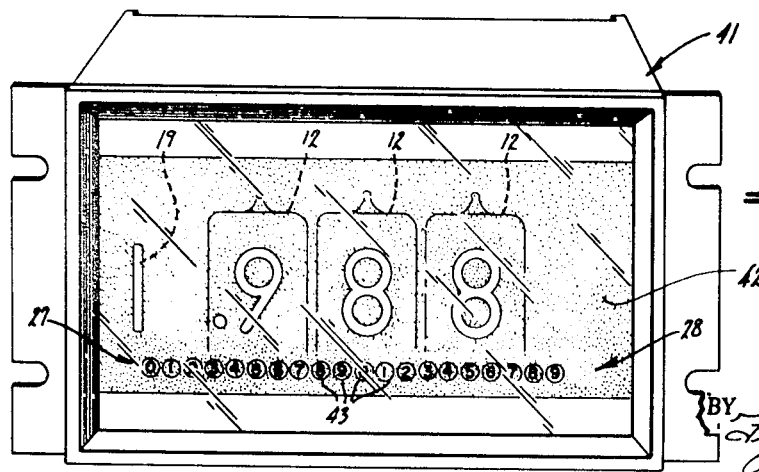
FIG. 2 is a perspective view of a digital meter with auxiliary visual display incorporating one embodiment of the present invention.
Figure 3:
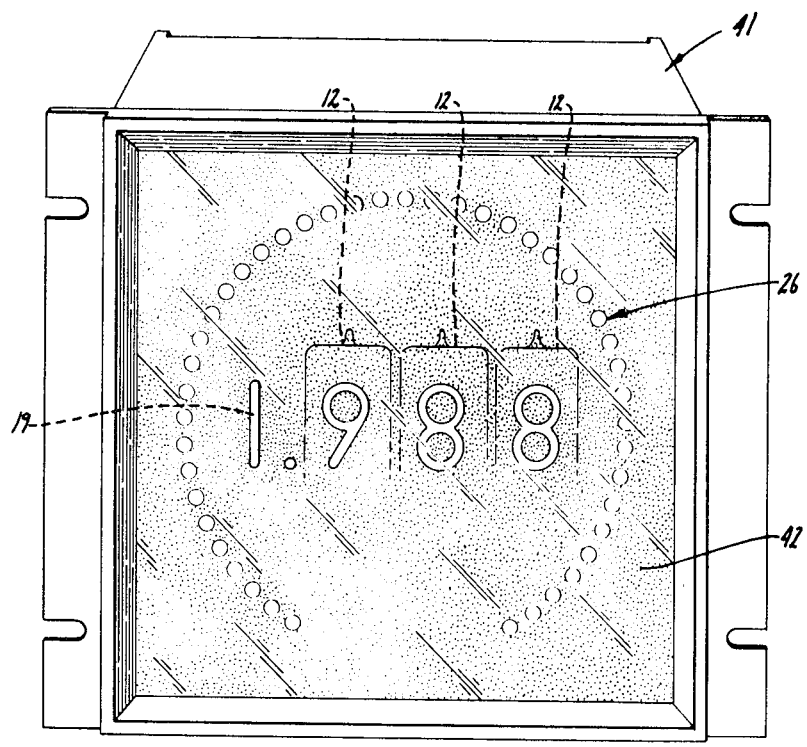
FIG. 3 is a perspective view of a digital meter with auxiliary visual display incorporating a second embodiment of the present invention.

Additional visual display means is provided which indicates by a physical position the location of the reading of the meter with respect to the range of the meter. Such additional visual display means is in the form of a plurality of discrete visual display elements 26 which are arranged in a predetermined manner as, for example, in a row as shown in FIG. 2 or in a circle as shown in FIG. 3. Typically, the visual display elements 26 can be in the form of small neon bulbs arranged in a row. Alternatively, these neon bulbs can be arranged in a circle, or the display elements can be in the form of a long neon tube which can be lit up in incremental steps. In the arrangement shown in FIG. 1, two separate rows 27 and 28 of visual display elements 26 have been provided. The first row has been provided for the most significant digit provided by the series of decimal counting units 11 and the other row 28 is provided for the over-range indication given by the neon tube 19. Conductors 29 connect the visual display elements 26 in the first row 27 in parallel with the corresponding conductors 13 connected to the Nixie 12 which represents the most significant digit provided by the decimal counting units 11. Additional conductors 31 are provided for connecting the visual display elements 26 in the row 28 in parallel with the conductors 13 so that the visual display elements are given a weight of zero through nine in each row corresponding to the indication which would be given by the Nixie tube 12 from the information supplied by the decimal counting unit 11 and the decoder 14.

Means is provided for energizing the visual display elements 26 and consists of a source of high voltage which is connected to a conductor 32. However, since an over-range indication is provided in FIG. 1, it is necessary to provide means so that the proper visual display element in the rows 27 and 28 is energized or lit and consists of a pair of transistors Q1 and Q2 which are also connected to the source of high-voltage 32 and which are connected by conductors 36 and 37 to the over-range flip-flop 18. When the flip-flop 18 is in one of its conditions, the transistor Q1 is made conducting so that it, in effect, grounds the high-voltage source on the conductor 32 to prevent any of the visual display elements 26 from being lit. Conversely, when the flip-flop 18 is in its other condition, the transistor Q2 is made conducting to ground the source of high voltage on the conductor 32 to prevent any of the visual display elements 26 in the row 28 to be lit.

As shown in FIG. 2, the digital meter can be incorporated in a very small case 41 with the Nixies 12 giving a three-digit indication as shown and with the over-range indicator 19 giving an indication of one. The case 41 can be provided with a front glass panel 42 which carries numbers 43 ranging from zero to none for each of the two rows 27 and 28 of visual display elements.

In the embodiment shown in FIG. 3, the visual display elements 26 are disposed in an array which is in the form of an arc which generally corresponds to at least part of a circle and preferably, as shown, may extend through a major part of a circle. The display elements generally surround the Nixies 12 and the over-range indicator 19. This embodiment enables the use of a greater number of visual display elements in a meter of a given size than does the embodiment shown in FIG. 2. For example, I have constructed a meter according to this embodiment having 100 neon lights arranged in a circular arc of approximately 300° and having a case of substantially the same size as that used for the embodiment shown in FIG. 2.

The number of visual display elements can be any number greater than one. While the embodiments shown in the drawing have been described as having 20 and 100 lamps, respectively, it is not necessary that the number be a multiple of 10. As the number of display elements is increased, the range represented by each is decreased, thus giving a more accurate indication of the reading of the meter.

The auxiliary visual analog display means described herein can be incorporated in a meter of the zero-center type, wherein the visual display element located at center of the array would correspond to a zero reading on the Nixie tubes and the elements on either side of the central element would correspond to positive and negative readings.

Operation and use of the digital meter with auxiliary visual analog display may now be briefly described as follows. Let it be assumed that enough input events have been received by the digital meter so that the digital meter has registered in the Nixie tubes counts of 9, 8 and 8 as shown in FIG. 2, and that in addition, the last decimal counting unit 11 in the series has caused the flip-flop 18 to assume its set state to cause energization of the neon tube 19 and to give and over-range indication of one to give a total reading of 1.988. When the flip-flop 18 is in a set condition, it will cause the transistor Q1 to become conducting to ground the visual display elements 26 in row 27 to prevent their energization. This means that only the visual display elements 26 in the row 28 can be energized. Since the Nixie 12 connected to the most significant decimal counting unit 11 is registering a count of nine, this means that the visual display element 26 behind the number nine in the row 28 would be energized to provide an auxiliary visual display indicates by physical position the location of the reading of the meter with respect to the range of the meter. In other words, it indicates that with such a reading the meter is in its uppermost range. Thus, an operator could immediately appreciate the value which is being indicated by the meter by merely noticing the location of the visual display element which is lit. As can be appreciated, this is similar to the indication which is given by an analog meter which is provided with a needle which is deflected in accordance with the magnitude being recorded by the meter without making it necessary to observe the exact numbers being recorded and then to make a mental determination in his mind with respect to the range of the meter to determine where in this range the meter is giving an indication.

The use of such a digital meter is particularly advantageous where a plurality of such meters is being utilized and it is necessary for the operator to inspect all of the meters. In such a case, it is only necessary for the operator to quickly glance at the meter to determine the location of the visual display element 26 which is lit in the meter and to do the same for all of the other meters. In this way, the operator can very quickly determine the magnitudes which are being indicated by the meters with respect to the range of the meter without having to take the time to mentally observe the number which has been recorded by the meter and then to correlate this with the range of the meter.

In view of the fact that the visual display elements provide a light which gives an indication much the same as the needle on an analog meter, the visual display elements can be interpreted as forming a light needle which simulates the deflection of a needle on a meter.

If the over-range indication has not been lit, there would be no indication on the meter and, therefore, the flip-flop 18 would be in its reset condition, and in this condition the transistor Q2 would be conducting to ground the high voltage on the conductor 32 to prevent energization of the visual indicating elements in row 28. When this is the case, only the visual indicating elements in row 27 would be lit to indicate the digit which is being depicted by the Nixie 12 representing the most significant digit provided by the decimal counting units 11. This also would give an auxiliary visual indication ranging from zero to nine so that again an operator could very readily note the reading being given by the meter by noting the position of the visual display element 26 which is lit.

It is apparent from the foregoing that there has been provided a new and improved digital meter with auxiliary visual display means which makes it possible by noting the physical position of a visual display element to determine the location of the reading of the meter with respect to the range of the meter. The digital meter is relatively compact so that it can be incorporated in a space which is typically provided for such a meter at the present time.

I claim:

1. In a digital meter with auxiliary visual analog display for registering the cumulative total of input events, at least two decimal counting units connected in series so that one of said two decimal counting units represents a digit more significant than the digit represented by the other of said two decimal counting units, digital visual display means coupled to each of said decimal counting units to give a digital display of the count registered by the decimal counting unit, and analog visual display means coupled to said decimal counting unit representing the most significant digit to give an independent auxiliary visual display of the count registered by the decimal counting unit representing the most significant digit, said auxiliary visual display being in relatively close proximity to said digital visual display means so that both said digital visual display means and said analog visual display means can be viewed simultaneously, over-range indicating means coupled to said decimal counting unit representing the most significant digit, said analog visual display means being in the form of two parallel connected sets of discrete visual display elements and means connected to said over-range indicating means for preventing one set of said discrete visual display elements from being effective when there is an over-range indication and preventing the other set of visual display elements from being effective when there is not over-range indication.

2. A digital meter as in claim 1 in which the discrete visual display elements in both sets are arranged so that each element in each sets is assigned a value which is greater than that assigned to the preceding element.

3. A digital meter as in claim 1 wherein the digital value display means for the decimal counting units are arranged in a row and wherein the discrete visual display elements are arranged in a row and generally centered with respect to the row of digital visual display means.

4. A digital meter as in claim 3 in which the row of visual display elements is in the form of a straight line.

5. A digital meter as in claim 3 wherein said row of visual display elements is in the form of an arc.

6. A digital meter as in claim 1 wherein said digital visual display means for each decimal counting unit is capable of displaying numbers from 0 to 9.

7. In a digital meter for registering input events, a case having a frontal portion which can be viewed, at least two decimal counting units connected in series for counting the input events so that one of said two decimal counting units represents a digit more significant than the digit represented by the other of said two decimal counting units, digital visual display means coupled to each of said decimal counting units to give a visual display in numbers from 0 to 9 of the count registered by the decimal counting unit and in proximity to said frontal portion of said case, and analog visual display means coupled only to said decimal counting unit representing the most significant digit and being formed of at least 10 discrete visual display elements with each of said discrete visual elements being coupled to the decimal counting unit in such a manner so that each of the discrete visual display elements is assigned a value corresponding to one of the counts being capable of being displayed by the digital visual display means whereby for each count displayed by the digital visual display means, a corresponding discrete visual display element will be made effective, said discrete visual display elements being in relatively close proximity to the frontal portion of said case whereby said digital visual display means and said discrete visual display elements may be viewed at the same time, said discrete visual display elements serving to give a visual indication by physical position of the count being displayed by the digital visual display means.

8. A digital meter as in claim 7 wherein said visual display means are in a row and wherein said discrete visual display elements are also arranged in a row generally centered with respect to row of digital visual display means.

9. A digital meter as in claim 8 wherein said row of discrete visual display elements is in the form of a straight line.

10. A digital meter as in claim 7 wherein said row of discrete visual display elements is in the form of an arc.